United States Patent
Coté et al.

[11] Patent Number: 5,920,039
[45] Date of Patent: Jul. 6, 1999

[54] SPEAKER SUPPORT BAR AND SOUND CHAMBER ABOVE VEHICLE HEADLINER

[75] Inventors: Janice E. Coté, Plymouth; Anthony J. Finocchio, Macomb; Edward C. Curtindale, Farmington Hills, all of Mich.

[73] Assignee: United Technologies Automotive, Inc., Dearborn, Mich.

[21] Appl. No.: 08/603,136

[22] Filed: Feb. 20, 1996

[51] Int. Cl.$^6$ ................ G08B 1/08; H05K 5/00
[52] U.S. Cl. ............. 181/141; 181/144; 181/150
[58] Field of Search ................. 181/141, 144, 181/148, 150; 381/86, 188, 205

[56] References Cited

U.S. PATENT DOCUMENTS

| | | | |
|---|---|---|---|
| 3,268,229 | 8/1966 | Funk | 181/144 |
| 4,005,761 | 2/1977 | Okamoto et al. | 181/141 |
| 4,056,165 | 11/1977 | Okamoto et al. | 181/141 |
| 4,099,026 | 7/1978 | Persson et al. | 181/144 |
| 4,100,372 | 7/1978 | Hypolite | 181/148 |
| 4,484,658 | 11/1984 | Grote | 181/150 |
| 4,673,056 | 6/1987 | Koppelomaki | 181/141 |
| 4,891,842 | 1/1990 | Green | 181/150 |
| 4,913,484 | 4/1990 | Dowd et al. | 296/97.12 |
| 4,923,032 | 5/1990 | Nuernberger | 181/150 |
| 5,094,316 | 3/1992 | Rosen | 181/141 |
| 5,171,054 | 12/1992 | Wilson | 296/37.16 |
| 5,414,229 | 5/1995 | Rocheleau et al. | 181/150 |
| 5,465,200 | 11/1995 | Finocchio et al. | 362/368 |
| 5,565,659 | 10/1996 | Moner, Jr. et al. | 181/150 |
| 5,606,623 | 2/1997 | Bahm, III et al. | 181/144 |

FOREIGN PATENT DOCUMENTS

| | | |
|---|---|---|
| 2344423 | 3/1977 | France . |
| 3028985 | 7/1982 | Germany . |
| 4413626 | 11/1994 | Germany . |
| 61-181739 | 8/1986 | Japan . |
| 7603422 | 4/1978 | Sweden . |
| 1151734 | 5/1969 | United Kingdom . |

*Primary Examiner*—Eddie C. Lee
*Attorney, Agent, or Firm*—Howard & Howard

[57] ABSTRACT

A speaker support bar supports a pair of speakers and speaker covers above a vehicle headliner. A lamp may also be mounted into the support bar. The speaker support is positioned vertically above the headliner, and thus the uniform appearance of the headliner is preserved. The speaker support extends between lateral support ends which transfer the weight of the speakers to the headliner over a wide area, and near the vehicle frame. Thus, the headliner is able to easily support the weight of the speakers. A seal incorporated into the headliner defines a sound chamber. The invention also facilitates the pre-assembly of the headliner and its sound system prior to attachment of the headliner to the vehicle.

7 Claims, 2 Drawing Sheets

SPEAKER SUPPORT BAR AND SOUND CHAMBER ABOVE VEHICLE HEADLINER

BACKGROUND OF THE INVENTION

This invention relates to a speaker support bar that provides a rigid mount for a pair of speakers above a vehicle headliner and also provides a sound chamber to improve acoustic quality.

Headliners provide interior trim on the ceiling of vehicles. Typically, headliners are made from a relatively non-rigid material. Headliners thus do not have the ability to support heavy loads. More recently, there has been emphasis on reducing the weight and cost of the headliner, thus, even further reducing its ability to support loads.

Speakers for vehicle sound systems have typically been mounted in door panels, or the rear deck of a vehicle. Speakers have been mounted in the ceiling of a vehicle only in a few narrow applications. For the most part, the known attempts to mount speakers in the ceiling of a vehicle have required a rigid support structure, beneath the headliner, and extending into the passenger compartment. These support structures detract from the otherwise uniform appearance of a headliner, and thus, are undesirable.

Moreover, the known speaker supports have typically required assembly at the vehicle assembly line separate from the headliner. Vehicle manufacturers would like to increase flexibility in the number of assembly steps that occur at a vehicle assembly line. Thus, modular constructions that may be pre-assembled at a supplier location and then shipped as an assembled unit to the vehicle assembly line are desirable. Typically, the known speaker supports have not facilitated pre-assembly of a vehicle ceiling sub-assembly.

SUMMARY OF THE INVENTION

In a disclosed embodiment of this invention, a relatively rigid speaker support bar is provided above a headliner. The basic speaker support bar is disclosed and claimed in co-pending U.S. patent application, Ser. No. 08/604,006, entitled Speaker Support Bar For Use Above Vehicle Headliner. The speaker support bar has a central portion with two support legs at outer lateral ends that spread the weight of the speakers over a large area on the headliner. The speaker support bar preferably supports a pair of speakers. Speakers are mounted within the headliner by attachment members attached directly to the speaker support bar. The headliner appearance remains uniform other than the speaker covers. In a further feature, the speaker support bar may also provide a mount location for a vehicle lamp.

In preferred details of this invention, the speaker support bar preferably has a pair of speaker mount apertures that each receive bolts from a speaker, and other apertures which receive legs from a speaker cover.

In one embodiment, the speaker support bar has longitudinally extending legs extending perpendicular to the laterally outer ends. These legs further spread the weight of the speakers across the headliner surface, thus improving the ability of the headliner to carry the weight.

The novel speaker support bar is incorporated as part of a system that provides improved acoustic qualities. A space formed above the headliner receives the speaker support bar. The central portion of the speakers support bar is spaced vertically above the outer lateral ends, ensuring that the rear of the speaker is spaced slightly above the headliner, but still below the vehicle ceiling. Thus, a sound chamber is provided. A seal is positioned slightly longitudinally away from the speaker support bar to enclose and define a sound chamber. In one preferred embodiment, the speakers are mounted near the rear longitudinal end of a vehicle. The seal is a foam rubber seal positioned slightly longitudinally forwardly of the speaker support bar and compressed between the headliner and the vehicle ceiling. Thus, the sound chamber is defined between the lateral ends of the vehicle, rearwardly of the seal, and forwardly of the longitudinal rear of the vehicle.

In other features of this invention, the speaker support bar allows a vehicle headliner to be pre-assembled, and then attached at the vehicle assembly line as a single sub-assembly. Speakers, covers, and any other accessories such as sun visors, lamps, etc., are pre-mounted to the headliner. The fully assembled headliner may then be attached as a unit to the vehicle ceiling. This facilitates manufacturing freedom in selecting the location of the assembly steps.

In a method of assembling a vehicle headliner, speakers and covers are attached to a headliner through the speaker support bar. The speaker support bar is on a non-exposed surface of the headliner, and the speakers extend through the headliner to the exposed surface of the headliner. The pre-assembled headliner, speakers, speaker covers, and speaker support bar are then attached to a vehicle. Other accessories such as lamps, visors, etc., may also be pre-assembled to the headliner before the assembled headliner is attached to the vehicle.

These and other features of the present invention will be best understood from the following specification and drawings, of which the following is a brief description.

DETAILED DESCRIPTION OF A PREFERRED EMBODIMENT

Figure 1:
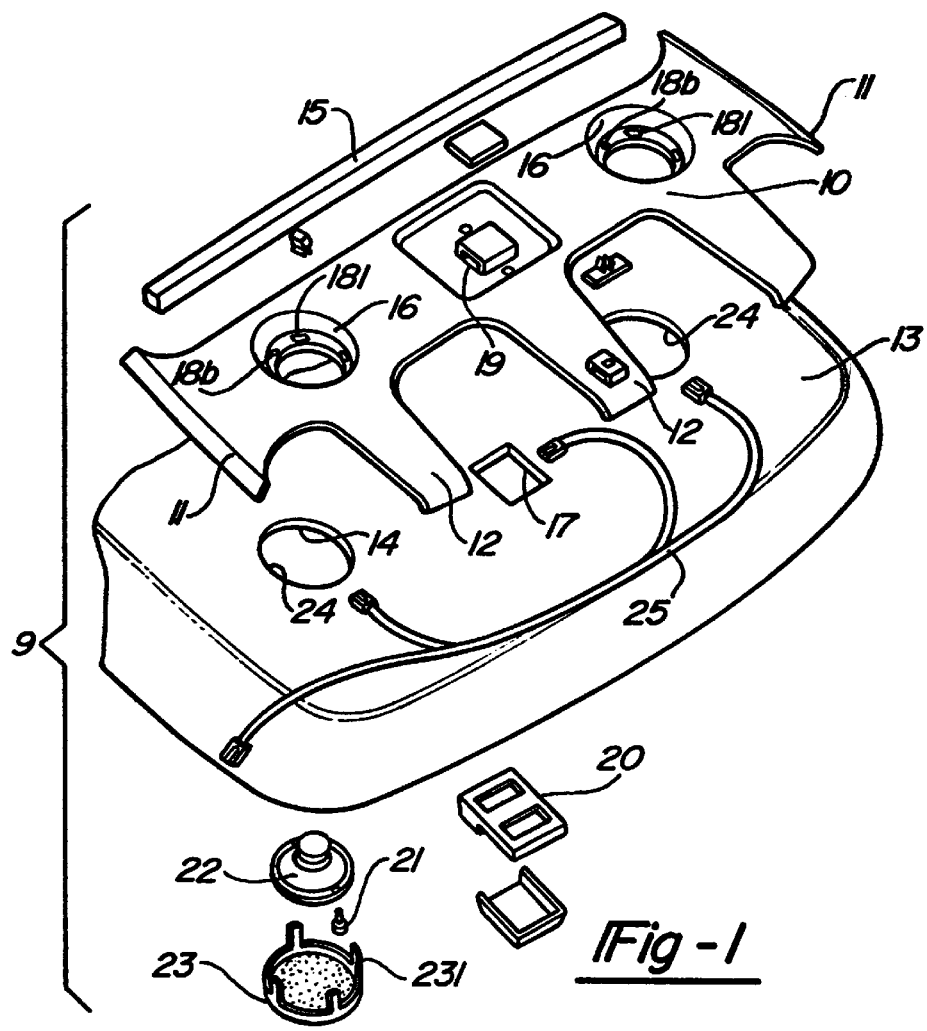
FIG. 1 is an exploded view of a first embodiment headliner and speaker support system.

FIG. 1 shows a partial vehicle headliner 9, having a speaker support bar 10 with laterally spaced support ends 11, and longitudinally extending support legs 12. The speaker support bar 10 is mounted above a non-exposed surface 13 of headliner 9. An opposed exposed face 14 of headliner 9 facing into the plane of FIG. 1, is formed with a trim surface (see FIG. 4).

Seal 15 is attached to headliner 9 at a location spaced forwardly of the speaker support bar 11. As will be described below, the seal 15 assists in defining a sound chamber above headliner 9.

A pair of speaker mount locations 16 are laterally spaced within speaker support bar 10. Each mount 16 is spaced from an upper surface of the speaker support bar in the same direction as the laterally spaced support ends 11. It is preferred that the bottom-most portion of the mount location 16 is above the headliner. That is, the speakers are to be supported slightly above the surface 13 of headliner 9. A mount location 19 may mount a lamp 20. Bolts or other attachment structures may be utilized to attach the lamp at mount 19. The lamp 20 extends through an opening 17 in the headliner 9.

Bolts 21 attach speakers 22 to the bolt openings 18b in mount 16. Similarly, a cover 23 has cover legs 231 which snap into openings 181. The speaker 22 and cover 23 extend through the openings 24 in the headliner 9. Preferably, the cover 23 is flush with the surface 14 of the headliner 9 when the system is fully assembled. Alternatively, it may be preferred that a lip extend slightly radially outwardly from the location of the legs 231 to enclose a gap between the surface of the cover 23 and the opening 24. Wire harness 25 provides electrical connections to the speakers, lamps, etc.

When the speakers are assembled to the speaker support bar 10, the weight of the speakers is spread and transferred to the headliner at the lateral support ends 11, and the several longitudinal support legs 12. As such, the weight is transferred over a wide area of the headliner, and the headliner is able to easily support the weight of the speakers. In addition, the weight is adjacent the location where the headliner is fixed to the vehicle frame, thus making it easier for the headliner to support the weight.

Figure 2:
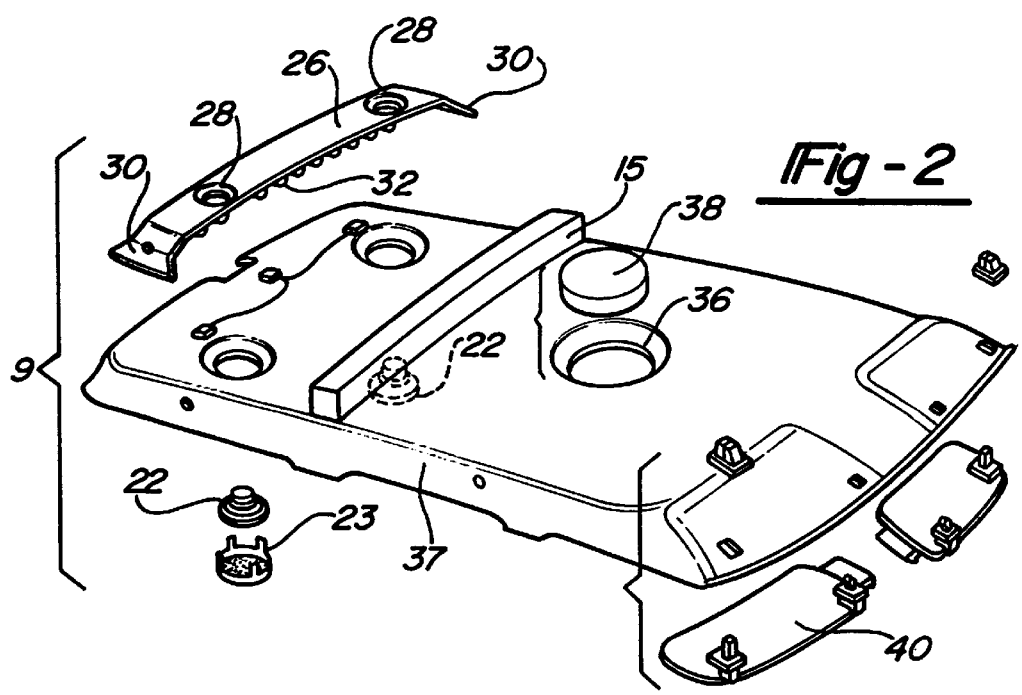
FIG. 2 shows a second embodiment speaker support incorporated into a headliner.

FIG. 2 shows the entire headliner 9, with a distinct embodiment speaker support bar 26. The speaker support bar 26 includes speaker mount locations 28, and two laterally spaced lateral support ends 30. Again, the lateral support ends support the weight of the speaker on the upper surface 13 of the headliner 9. As can be seen in this figure, the speaker support bar is mounted towards a rear end of the headliner 9, and seal 15 is spaced forwardly of the speaker support 26. A plurality of ribs 32 may be formed underneath a central portion of speaker support bar 26 to provide additional rigidity.

Openings 36 in the headliner 9 may receive a lamp 38. The headliner 9 also typically includes other accessories such as visors 40. The wire harness also provides connections for lamp 38, and any other accessories that may be mounted near the front of the headliner 9.

In both embodiments, the laterally outer edges 37 of the headliner 9 slope vertically downwardly from a central portion of the headliner. The lateral support ends 11 or 30 also slope vertically downwardly and press on those outer edge surfaces of the headliner. The lateral support ends are the vertically lowermost part of the speaker support bars, and are spaced vertically downwardly from the speaker mount locations 16 or 28.

Figure 3:
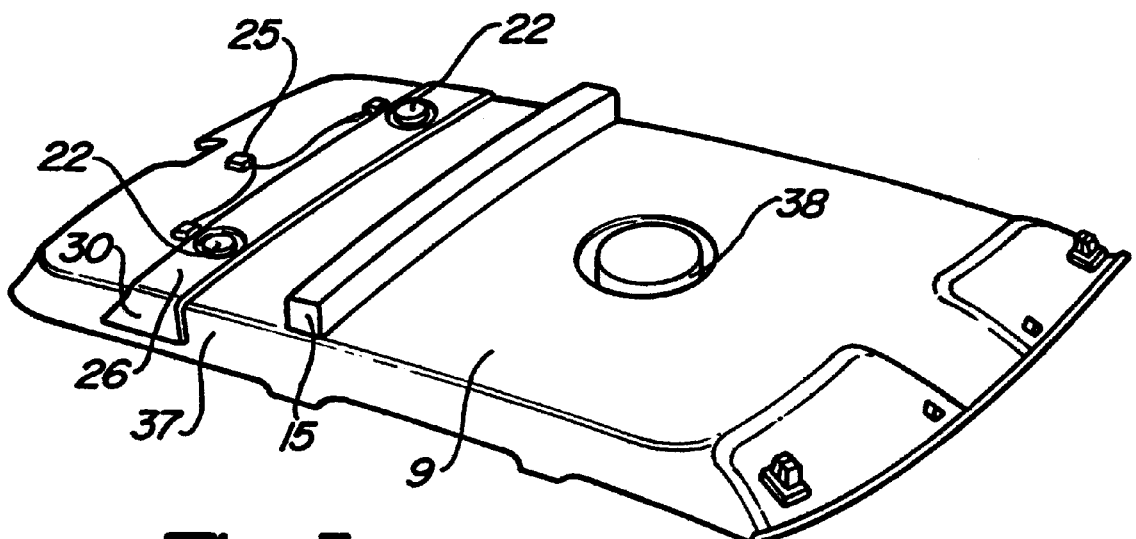
FIG. 3 is an assembled view of the system shown in FIG. 2.

As shown in FIG. 3, an entire headliner assembly has now been pre-assembled. Support ends 30 rest on edges 37. Due to the unique speaker support bar 26, the entire speaker system may be incorporated into the headliner 9 prior to delivery to the vehicle assembly location. The workers at the vehicle assembly location now merely must connect an electrical wire harness to harness 25 (and any other harness), and then can mount the headliner 9 within the vehicle. This reduces the number of constraints on the vehicle assembly line.

Figure 4:
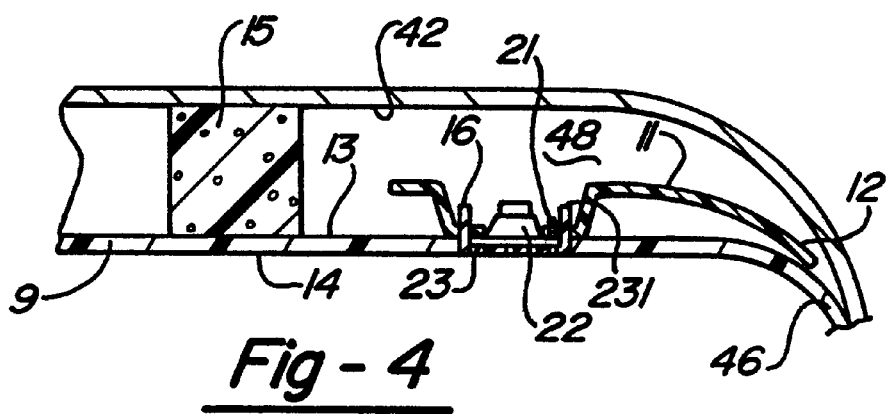
FIG. 4 is a cross-sectional view through a portion of a vehicle having the inventive speaker support bar system.

One other important attribute of the overall vehicle speaker support bar system and headliner is shown in FIG. 4. Headliner 9 has now been mounted to the vehicle ceiling 42. A rear end of the vehicle ceiling 44 receives an end portion 46 of the headliner 9. A seal is provided by the headliner end portion 46 in a known fashion. A sound chamber 48 is defined above the headliner surface 13, and the speaker 22 is supported within that sound chamber such that good acoustic characteristics are achieved. Seal 15 is formed of a soft foam rubber, and is preferably compressed between ceiling 44 and headliner 9 to provide a seal. Seal 15 may be formed of a nitrile foam rubber. The positioning of the seal 15 forwardly of the rear location further defines and encloses the sound chamber 48. Thus, with the inventive system, not only is there greater freedom in the location of mounting of the speaker, but there are better acoustic characteristics than with the prior art.

As also shown, the longitudinal support end 12, is spaced vertically downwardly from the speaker mount location 16. The lateral support ends 11 are at an approximately equal vertical location as the longitudinal support ends 12. Thus, the weight of the speaker is spread over a wide area, and supported at a location close to the vehicle frame. As such, the headliner is able to easily transfer that weight to the vehicle frame, and is thus able to better support the speaker weight. If the speaker were mounted directly in the headliner, the weight would be supported near the middle of the headliner, and the headliner would have more difficulty supporting the weight.

In a method of utilizing the inventive system, the headliner is first pre-assembled as shown in FIG. 3 to include the speakers, the speaker support bar 26 and any other accessories. The pre-assembled headliner is then attached to the vehicle as shown in FIG. 4 (FIG. 4 shows the support bar 11). The vehicle accessory supplier may thus supply a pre-assembled headliner to the vehicle assembly line. The vehicle assembler merely attaches the entire headliner to the vehicle. Thus, freedom in the location and order of manufacturing steps is improved.

The speaker support bars are preferably molded from a suitable plastic. One acceptable material is a polycarbonate available from GE Plastics under the trade name Lexan 101. The headliner is formed of standard headliner material. The support bars are relatively more rigid than the headliner, which is relatively flexible when compared to the speaker support bar.

Preferred embodiments of this invention have been disclosed, however, a worker of ordinary skill in the art would recognize that certain modifications would come within the scope of this invention. For that reason, the following claims should be studied to determine the true scope and content of this invention.

We claim:

1. A vehicle headliner assembly comprising a headliner body extending between longitudinally forward and rear positions and laterally spaced lateral ends, said headliner body having a first trim face to be exposed when said headliner body is mounted to a vehicle, and a second non-exposed face vertically above said exposed face when said headliner body is mounted to a vehicle, and speaker openings formed through said headliner;

a speaker support bar positioned above said non-exposed face of said headliner body, said speaker support bar having speaker mount locations aligned with said speaker openings through said headliner body, said speaker mount locations including mounting structure to mount a speaker, and said speaker support bar having spaced support ends contacting said headliner body at spaced locations, and transferring weight to said headliner body;

speakers mounted to each of said speaker mount locations in said speaker support bar, said speakers extending through said speaker openings in said headliner body, and being mounted to said speaker mount location on said speaker support bar; and a compressible seal spaced longitudinally from said speaker support bar, said seal defining a sound chamber above said non-exposed face of said headliner body when said headliner body is mounted to a vehicle.

2. A headliner as recited in claim 1, wherein said speaker support bar includes laterally spaced support ends and longitudinally extending support legs for contacting said headliner body at position spaced laterally and longitudinally from said speakers.

3. A headliner as recited in claim 1, wherein said headliner, said speaker support bar and said speakers are all pre-assembled as a unit before assembly of said unit to a vehicle.

4. A headliner as recited in claim 1, wherein said speaker support bar has a central portion spaced between said support ends, and said central portion being formed with a plurality of strengthening ribs.

5. A headliner as recited in claim 1, wherein a lamp is also mounted to said speaker support bar at a location laterally between said speakers.

6. A headliner as recited in claim 1, wherein said mounting structure at said speaker mount locations includes a first set of mounting structure for receiving fastening structure from said speakers, and a second set of mounting structure for receiving fastening structure from a speaker cover, speaker covers being mounted below said speakers, and enclosing said speaker between said speaker cover and said speaker support bar.

7. A speaker support system in the ceiling of a vehicle comprising a vehicle frame defining an upper end for said system;

a headliner extending between longitudinally forward and rear ends and laterally spaced ends, said headliner being attached to said vehicle frame, said headliner being spaced vertically below said vehicle frame, a pair of speaker openings extending through said headliner;

a speaker support bar positioned vertically between said headliner and said vehicle frame, said speaker support bar having a pair of speaker mount locations, and a pair of spaced support ends, said support ends contacting said headliner;

speakers mounted in said speaker support bar at each of said speaker mount locations, said speakers being received in said speaker openings in said headliner, the weight of said speakers being transferred to said headliner by said support ends, and a sound chamber for said speakers being defined between said headliner and said vehicle frame; and a seal positioned longitudinally spaced from said speaker support bar, and extending between said generally laterally spaced ends, said seal further defining said sound chamber for said speakers.

\* \* \* \* \*

UNITED STATES PATENT AND TRADEMARK OFFICE
CERTIFICATE OF CORRECTION

PATENT NO. : 5,920,039
DATED : July 6, 1999
INVENTOR(S) : Janice E. Coté, et al.

It is certified that error appears in the above-identified patent and that said Letters Patent is hereby corrected as shown below:

Change item [73] Assignee from:

"United Technologies Automotive, Inc., Dearborn, Mich.";

to:

-- Lear Automotive Dearborn, Inc., Southfield, Mich and Daimler Chrysler Corporation, Auburn Hills, Mich. --.

Signed and Sealed this

Thirty-first Day of July, 2001

*Attest:*

Nicholas P. Godici

*Attesting Officer*

NICHOLAS P. GODICI
*Acting Director of the United States Patent and Trademark Office*